United States Patent [19]

Lupke et al.

[11] 4,305,703

[45] Dec. 15, 1981

[54] COMPOSITE DIE ASSEMBLY FOR USE IN THE PRODUCTION OF THERMOPLASTIC TUBING

[76] Inventors: Manfred A. A. Lupke, 36 Ironshield Crescent; Gerd P. H. Lupke, 46 Stornoway Crescent, both of Thornhill, Ontario, Canada

[21] Appl. No.: 186,627

[22] Filed: Sep. 12, 1980

[51] Int. Cl.³ .................... B29F 3/04; B29C 1/00; B29D 7/02

[52] U.S. Cl. .................... 425/72 R; 264/173; 264/209.1; 264/514; 425/133.1; 425/326.1; 425/380; 425/462

[58] Field of Search .............. 264/171, 209.1, 210.1, 264/514, 173, 515; 425/133.1, 133.5, 72 R, 380, 461, 462, 376 R, 379, 467

[56] References Cited

U.S. PATENT DOCUMENTS

| | | | |
|---|---|---|---|
| 3,024,494 | 3/1962 | Szpila | 425/462 |
| 3,241,503 | 3/1966 | Schafer | 425/462 |
| 3,538,209 | 11/1970 | Hegler | 264/173 |
| 3,677,676 | 7/1972 | Hegler | 425/504 |
| 3,694,292 | 9/1972 | Schippers et al. | 425/467 |
| 3,743,456 | 7/1973 | Cini | 425/131.1 |
| 3,976,414 | 8/1976 | Hegler et al. | 425/131.1 |
| 3,981,663 | 9/1976 | Lupke | 425/326.1 |
| 3,994,646 | 11/1976 | Hauck | 425/131.1 |
| 4,047,868 | 9/1977 | Kudo | 425/462 |
| 4,111,630 | 9/1978 | Schiomi et al. | 425/462 |
| 4,134,952 | 1/1979 | Yoshikawa et al. | 264/173 |
| 4,182,603 | 1/1980 | Knittel | 425/380 |
| 4,185,954 | 1/1980 | Murakami et al. | 425/467 |

FOREIGN PATENT DOCUMENTS

1199971 9/1965 Fed. Rep. of Germany ...... 264/173

*Primary Examiner*—W. E. Hoag
*Attorney, Agent, or Firm*—Ridout & Maybee

[57] ABSTRACT

The invention provides a die assembly comprising a nozzle and at least one mandrel which defines with the nozzle an annular die orifice. The nozzle has a longitudinally extending stem terminating in the sleeve, the mandrel being located coaxially within the sleeve and coupled to the stem of the nozzle by an axially extending screw threaded coupling. The mandrel includes an internal flow passage having an inlet positioned to receive thermoplastic material from a supply passage extending along the nozzle and an outlet positioned to deliver the material to an annular distribution chamber defined by the opposing surfaces of the mandrel and the sleeve. The distribution chamber provides an uninterrupted annular flow path extending from the outlet to the die orifice, thereby avoiding the disadvantage of imperfect material distribution. For the production of multiple-walled tubing, a plurality of die stages coupled together in coaxial relationships are provided, the die components being so coupled by axially extending screw threaded couplings so positioned as not to interfere with the flow of plastic materials.

16 Claims, 5 Drawing Figures

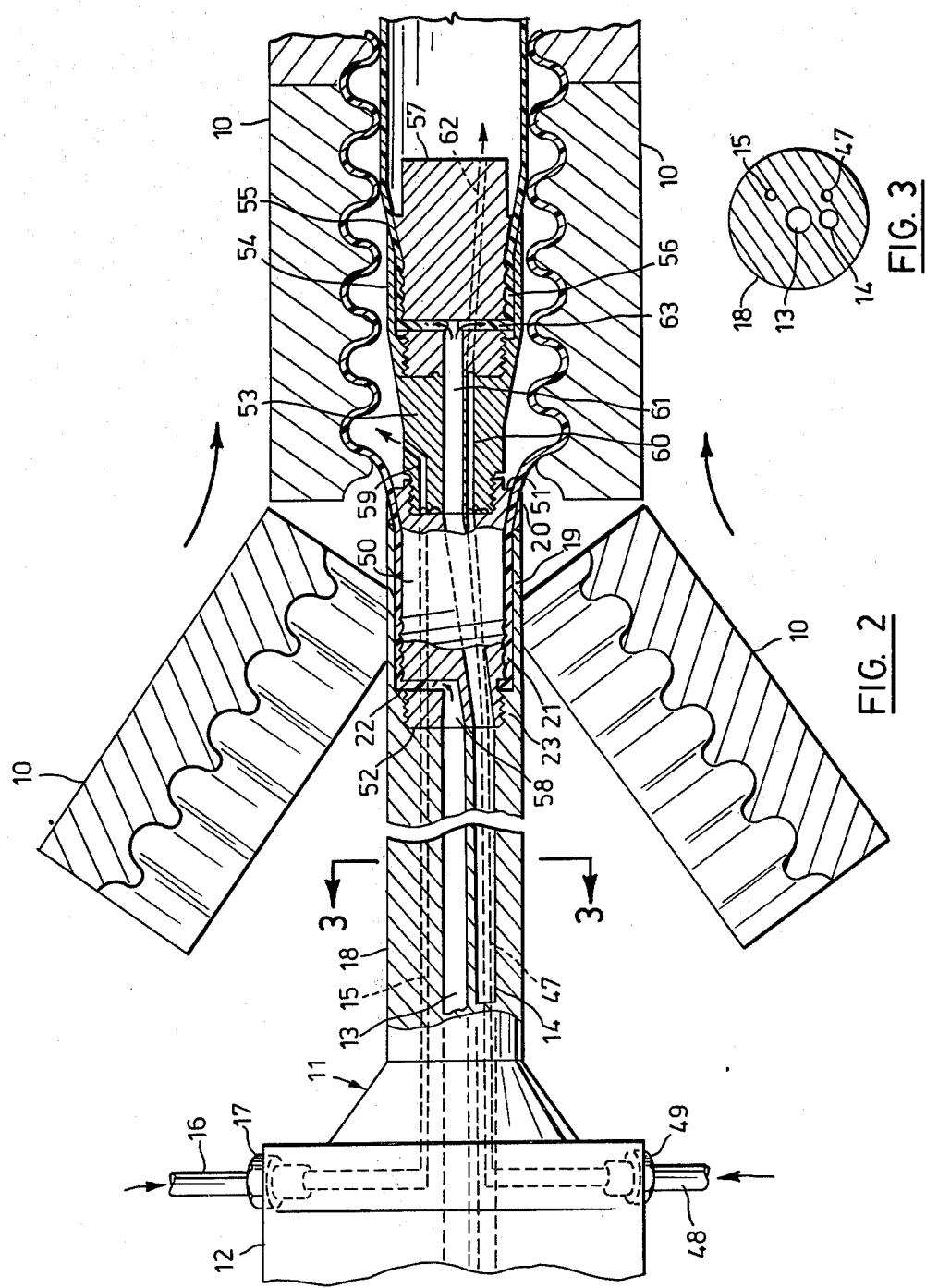

COMPOSITE DIE ASSEMBLY FOR USE IN THE PRODUCTION OF THERMOPLASTIC TUBING

This invention relates to die assemblies for use in the production of thermoplastic tubing, wherein the tubing is continuously extruded and concurrently molded to a required configuration, the mold typically being a recirculating bipartite mold of the general type disclosed in U.S. Pat. No. 3,981,663 to G.P.H. Lupke dated Sept. 21, 1976.

The invention is more particularly concerned with die assemblies for use in the production of multiple-walled tubing wherein tubes of thermoplastic material are continuously extruded from concentric dies and concurrently molded to the required composite configuration. However, the invention is not restricted to such die assemblies and in one aspect provides an improved die construction which may be used for a single-walled tube.

Typically, an annular extrusion die comprises a nozzle member adapted for attachment to an extrusion head, the nozzle member having a die lip at its delivery end, and a mandrel which is located within the nozzle member coaxially therewith, the mandrel defining with the die lip an annular extrusion orifice. The mandrel is usually supported within the nozzle member by a spider or equivalent radially extending means. This manner of support has the serious disadvantage that the stream of thermoplastic material is interrupted, or divided, in its passage to the annular die orifice, since the support means extends across the flow path. The result of this division of flow is that the material is imperfectly distributed at the die orifice and weaknesses may result in the extruded product. The disadvantage is all the more pronounced in the case of multiple die assemblies, wherein a plurality of coaxial dies are mounted in axially spaced relation along the path of flow. Another disadvantage of conventional die arrangements becomes apparent in cases where it is necessary to supply air for molding and/or cooling the extruded tubing as it is formed, for the air ducts must somehow be mounted within the nozzles and must inevitably interfere with the distribution of flow.

According to the present invention these disadvantages are avoided by providing a die assembly wherein the nozzle member includes a longitudinally extendng cylindrical stem terminating in a sleeve portion, the sleeve portion providing an outer die lip, and the mandrel is located coaxially within the sleeve portion to define an annular die orifice therewith, the mandrel being operatively mounted in the sleeve portion by axially extending coupling means on the stem portion. The mandrel includes an internal flow passage having an inlet positioned to receive thermoplastic material from a supply passage extending along the nozzle stem portion, and an outlet positioned to communicate with an annular distribution chamber formed between the mandrel and the interior of the sleeve. In this way the annular distribution chamber defines an uninterrupted annular flow path extending from said outlet to the die orifice, thereby enhancing the distribution of flow of the thermoplastic material. The mandrel may provide one or more internal air passages positioned to communicate with air supply passages extending along the stem of the nozzle. Such a construction may also be used in a composite die assembly for the production of multiple-walled tubing, each die orifice being formed by a respective nozzle member and mandrel, the die components being located coaxially with one another by axially extending coupling means which do not interrupt the annular flow paths. In this case the die components, other than the mandrel for the innermost tube, will include additional flow passages for the flow of thermoplastic material to the succeeding stages of the die assembly.

In order that the invention may be readily understood, several embodiments thereof will now be described, by way of example, with reference to the accompanying drawings, in which:

FIG. 2 is a sectional elevation of a second die assembly used in the production of double-walled thermoplastic tubing wherein the outer wall is corrugated and the inner wall is smooth;

FIG. 3 is a section on line 3—3 in FIG. 2;

Figure 1:
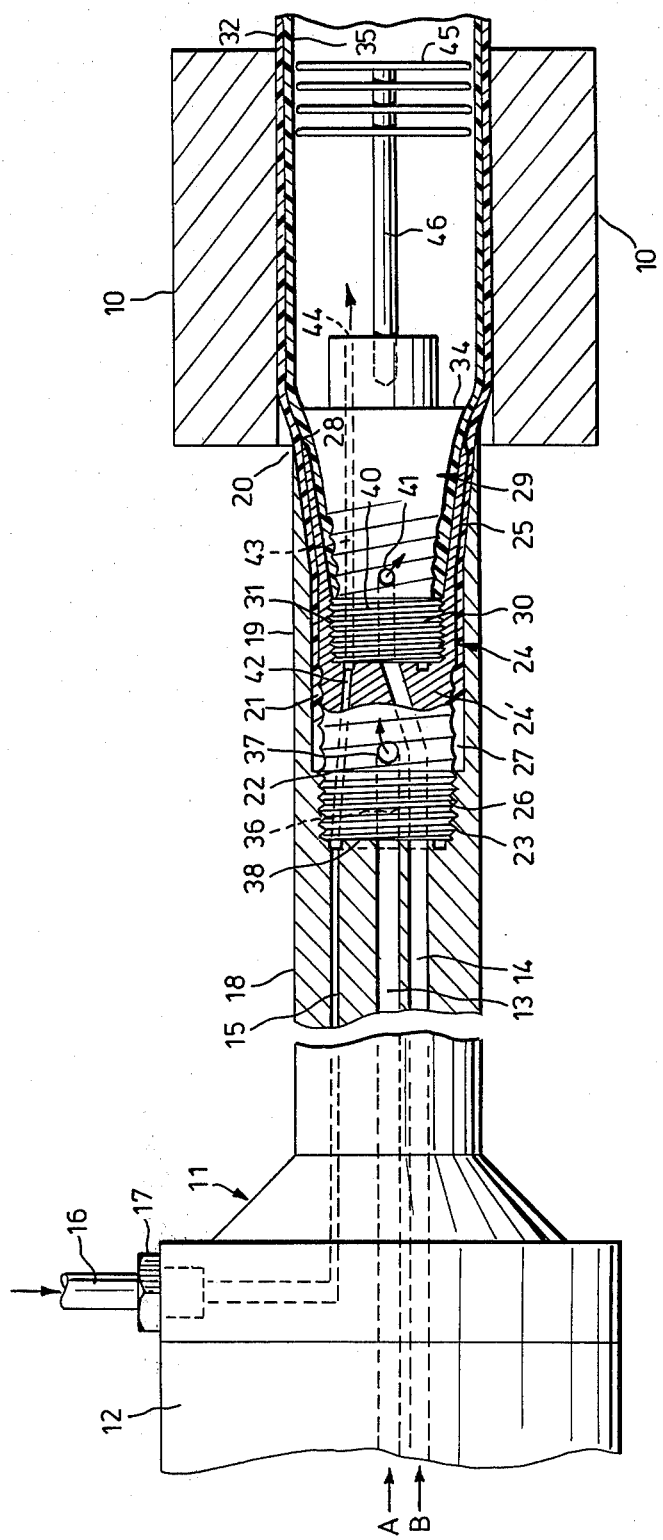
FIG. 1 is a sectional elevation of a die assembly used in the production of double-walled thermoplastic tubing.

The die assemblies shown in the drawings by way of example are all intended for use in the production of double-walled tubing wherein tubes of thermoplastic material are continuously extruded, concentrically one within the other, from coaxial die orifices. The tubes are extruded into a mold cavity formed by a bipartite mold of the recirculating mold block type, that is a mold formed by a pair of complementary mold trains each comprising an endless train of articulately interconnected mold blocks, each mold block being complementary to a mold block of the other train, and the mold blocks cooperating in pairs to form an axially extending mold cavity. Molds of this type are well known in the art, one such mold being shown in the above-identified U.S. Patent. However, the present invention is specifically concerned with the die assemblies, and to simplify the illustrations the mold themselves are shown diagrammatically.

Referring to FIG. 1, just two mold blocks of a bipartite mold of the recirculating type are illustrated at 10. These mold blocks have smooth interior surfaces defining a cylindrical mold cavity. A die assembly for extruding thermoplastic tubing into the cavity comprises an elongate nozzle member 11, the nozzle member 11 being adapted for attachment to an extrusion head 12 in the conventional manner. In the present example the extrusion head 12 is arranged to deliver two separate streams of thermoplastic material A, B, which may be the same material or different materials according to the specification of the end product. The nozzle member 11 provides two longitudinally extending supply passages 13, 14 which are positioned to receive the streams of thermoplastic material A, B from the extrusion head for delivering the materials to the delivery end of the nozzle member. Also provided in the nozzle member is a longitudinally extending internal air passage 15 for receiving pressurized air from a supply pipe 16 via a coupling 17.

The nozzle member 11 has a longitudinally extending cylindrical stem 18, which terminates in a cylindrical sleeve portion 19. The end of the sleeve portion is chamfered, forming a peripheral lip 20. The sleeve portion 19 encloses a recess 21 of circular cross section extending axially inwards from the lip 20 and being formed with an annular step 22 at its base. The step 22 defines an axially extending internally threaded socket 23 forming one member of a two-part coupling.

A die mandrel 24 is located within the recess 21 coaxially with the sleeve portion 19. This mandrel has a cylindrical stem or plug 24 terminating in a slightly flared sleeve portion 25. One end of the stem 24 is formed with an axially extending, externally threaded spigot 26 which is engageable in the socket 23 for locating the mandrel operatively within the recess 21. When the mandrel is so located, its external surface is spaced from the internal surface of the sleeve portion 19 to define therewith an annular distribution chamber 27.

The flared sleeve portion of the mandrel 24 similarly defines a peripheral lip 28 at its end, and further defines a second recess of circular cross section in which a second mandrel 29 is coaxially located, the second mandrel 29 being coupled to the first mandrel 24 by means of an axially extending externally threaded spigot 30 at the base of the latter which engages in an axially extending internally threaded socket 31 provided in the stem 24 at the base of the second recess. The lip 28 of the mandrel 24 defines with the lip 20 of the sleeve portion 19 a first annular die orifice from which an outer tube of thermoplastic material 32 is extruded. The mandrel 29 has a flared portion 33 terminating in a peripheral lip 34 which defines with the mandrel lip 28 a second annular die orifice from which an inner tube of thermoplastic material 35 is extruded.

Now the stem portion 24' of the mandrel 24 is formed with a first internal flow passage 36 having an inlet positioned to communicate with the supply passage 13 to receive thermoplastic material therefrom, and an outlet 37 positioned to communicate with the annular distribution chamber 27. A second flow passage 38 is provided in the stem portion 24', this flow passage having an inlet positioned to communicate with the supply passage 14 in the nozzle member and an outlet positioned to deliver thermoplastic material to the inlet of a flow passage 40 provided in the second mandrel 29. The flow passage 40 similarly has an outlet 41 communicating with the annular distribution chamber defined by the opposed surfaces of the mandrel 29 and the sleeve 25. Thus, in operation of the device, the thermoplastic material A is delivered via the supply passage 13, the flow passage 36 and outlet 37, to the annular distribution chamber 27 of the first die, where it finds an uninterrupted annular flow path extending from the outlet 37 to the outer die orifice. Similarly, the thermoplastic material B is delivered via the supply passage 14, flow passage 38, flow passage 40 and outlet 41 to the annular distribution chamber of the second die, where it finds an uninterrupted annular flow path extending from the outlet 41 to the inner die orifice formed by the lips 28 and 34.

In the present example the stem portions of the mandrels 24 and 29 are formed with helical or spiral grooves to induce a spiral component of flow to the thermoplastic materials as they are delivered along the respective distribution chambers.

For the purpose of molding the tubing within the mold cavity, pressurized air from the supply pipe 16 is delivered via the air passage 15 and serially connected air passages 42, 43 extending through the stem portions of the mandrels 24 and 29. The air is delivered interiorly of the inner die orifice via an outlet 44, that is, to the interior of the tube 35. To maintain an air pressure suitable for molding the tubing within the mold cavity, a set of annular baffles 45 is provided, this set of baffles being mounted on a rod 46 extending axially forwards from the mandrel 29.

Although this embodiment of the invention has been described with particular reference to the production of double-walled tubing, it could obviously be adapted to the production of single-walled tubing by providing a single die stage, or to the production of multiple-walled tubing by providing additional die stages.

The second die assembly shown in FIGS. 2 and 3 is basically similar to the first shown in FIG. 1, and the same reference numerals are used to denote corresponding parts. However, this die assembly is specifically designed for use in the production of tubing having a corrugated outer wall and a smooth inner wall. Accordingly, the mold blocks 10 are appropriately contoured for molding the outer wall, and two pressurized air supplies are required for molding the two extruded tubes. The outer wall could, of course, alternatively be molded by external vacuum rather than internal pressure.

The nozzle member 11 is essentially the same as the nozzle member 11 shown in FIG. 1 but it includes a second air passage 47 for delivering air at a second pressure received from an air supply pipe 48 connected to the nozzle member 11 by a coupling 49. The first die stage of this assembly includes a first mandrel 50 which, instead of being formed with a sleeve portion, provides a peripheral lip 51 which cooperates with the lip 20 to define a first annular die orifice. The mandrel 50 has an axially extending externally threaded spigot 52 which engages in the threaded socket 23 of the nozzle member 11 to locate the mandrel coaxially within the sleeve portion 19. A second nozzle member 53 is coupled to the mandrel 50 coaxially therewith, the second nozzle member 53 including a generally cylindrical stem terminating in a sleeve portion 54, this sleeve portion providing a peripheral lip 55 and defining a second internal recess 56 of circular cross section extending coaxially therefrom. A second mandrel 57 is coupled to the second nozzle member 53 coaxially therewith, this mandrel defining with the lip 55 a second annular die orifice. The nozzle member 53 and the mandrel 57 are respectively coupled to the mandrel 50 and the stem portion of the nozzle member 53 by respective axially extending screw threaded couplings which are substantially identical with the coupling 23, 52.

The first mandrel 50 provides an internal flow passage 58 having an inlet positioned to receive thermoplastic material A from the supply passage 13 and an outlet positioned to deliver the material to the annular chamber 21 of the first die stage. This mandrel also provides internal through-passages positioned to communicate with the passages 14, 15 and 47 of the nozzle member 11 for delivering thermoplastic material B and pressurized air to the next die stage. The second nozzle member 53 provides an air passage 59 for delivering air from the passage 15 to the interior of the outer tube formed from material A for molding this against the wall of the mold cavity. The stem portion of this nozzle member includes a second air flow passage 60 and a flow passage 61 for delivering air and thermoplastic material to respective passages 62 and 63 in the second mandrel 57. As is evident from FIG. 2, the flow passage 63 has an inlet positioned to communicate with the flow passage 61 to receive thermoplastic material B therefrom and an outlet for delivering the material to the distribution chamber 56 of the second die stage. The internal air passage 62 receives air from the supply pipe 48 and delivers it to the interior of the inner tube of thermoplastic material B.

Auxiliary means may be provided for assisting the joining of the two extruded tubes while they are plastic. In order to maintain the air pressure within the inner tube, a baffle arrangement similar to the baffle arrangement 45 of FIG. 1 may be arranged in a similar manner.

As in the first embodiment of the invention shown in FIG. 1, the distribution chambers 21 and 56 of the two die stages each define an uninterrupted annular flow path extending from the respective outlet into the chamber to the respective die orifice at the end of the chamber. Also, as in the first embodiment, the stem portions of the mandrels may be formed with helical or spiral grooves to assist the distribution of material by inducing a spiral component of flow thereto.

Figure 4:
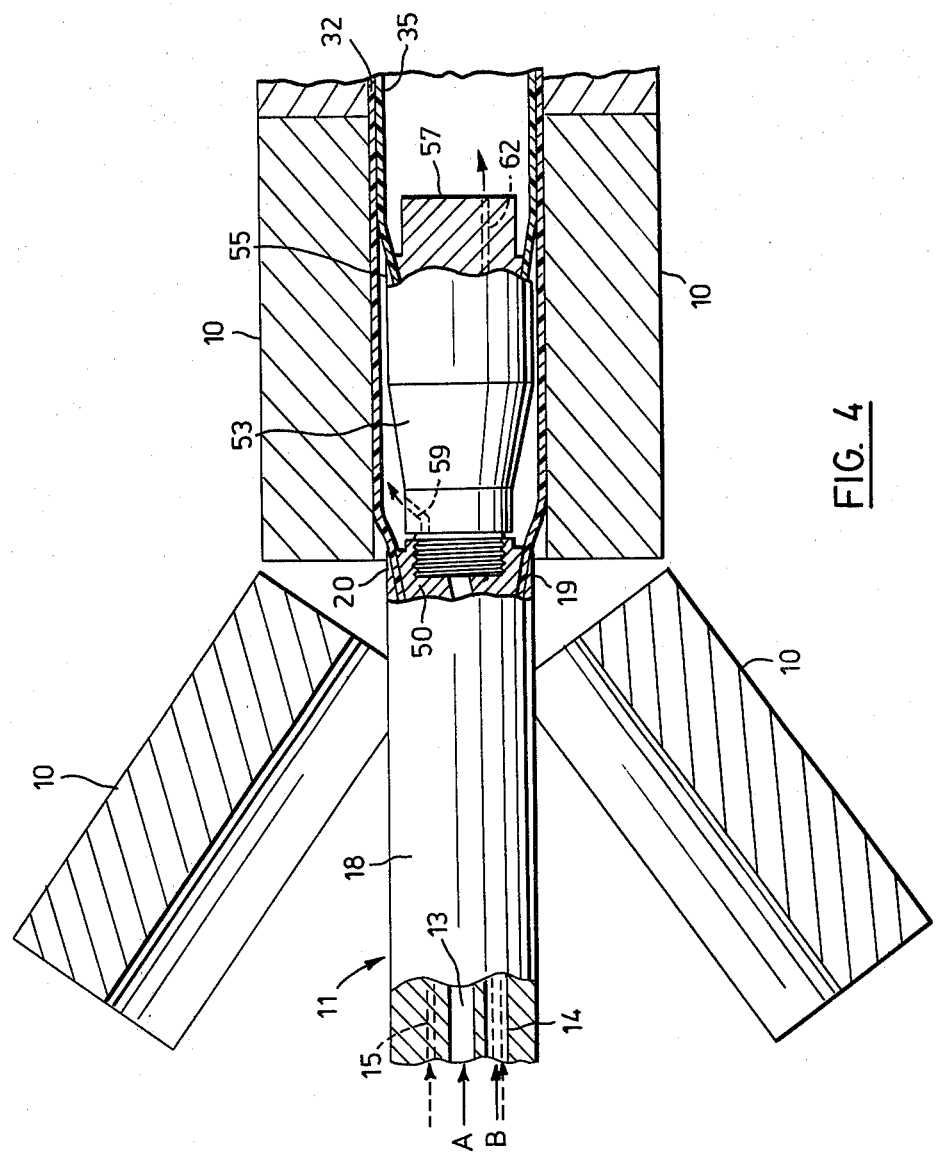
FIG. 4 is a partly sectioned view of a third composite die assembly.

The third die assembly shown in FIG. 4 is identical to the die assembly shown in FIGS. 2 and 3 and corresponding parts are denoted by the same reference numerals. The essential difference between this assembly and the previous one is that the mold blocks 10 have smooth interior walls defining a smooth walled-cavity. This die assembly is designed specifically for use in the production of smooth-walled double-ply tubing. As in the preceding embodiments, by reason of the fact that the die components are coupled together in coaxial relationship by axially extending coupling means, each of the thermoplastic materials is delivered into a respective distribution chamber which provides an uninterrupted annular flow path extending from the outlet into the chamber to the respective annular die orifice.

Figure 5:
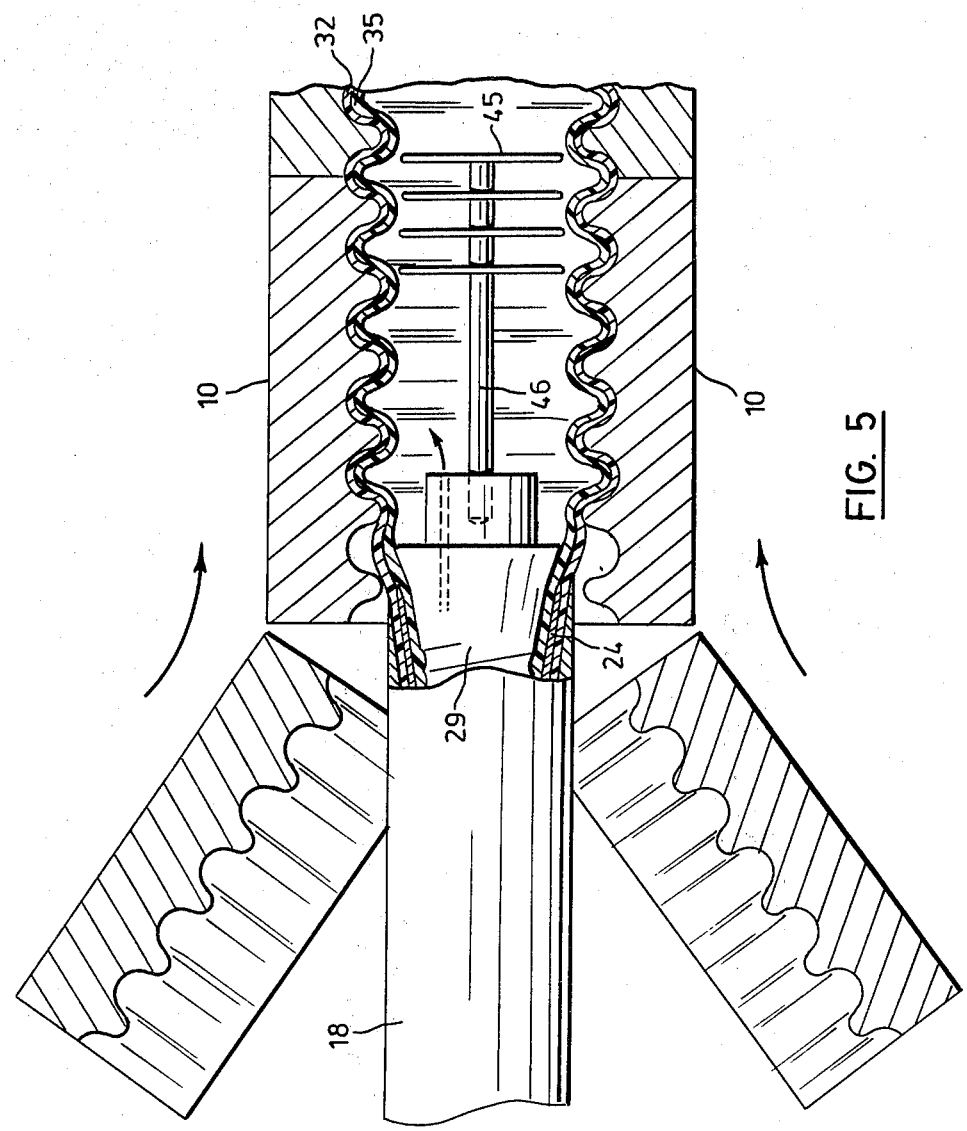
FIG. 5 is a partly sectioned view of yet another die assembly used in the production of two-ply corrugated thermoplastic tubing.

FIG. 5 shows a detail of a fourth die assembly which is identical in construction to the die assembly shown in FIG. 1, the same reference numerals being used to denote corresponding parts. The essential difference between this embodiment of the invention and the first embodiment of the invention is that the mold blocks 10 have contoured interior surfaces appropriate to the molding of corrugated tubing.

What we claim is:

1. A die assembly for use in the production of thermoplastic tubing, comprising:
   an elongate nozzle member adapted for attachment to an extrusion head, the nozzle member providing a longitudinally extending supply passage for the delivery of thermoplastic material to the delivery end thereof,
   the nozzle member including a longitudinally extending cylindrical stem terminating in a sleeve portion at said delivery end,
   the sleeve portion providing a peripheral lip and defining an internal recess of circular cross section extending axially therefrom,
   axially extending coupling means on said stem defining within said recess a first coupling member,
   a mandrel located coaxially within said recess, the mandrel defining with said peripheral lip an annular die orifice,
   the mandrel having an external surface spaced from said sleeve portion and defining therewith an annular chamber communicating with said die orifice,
   axially extending coupling means on said mandrel defining a second coupling member engageable with said first coupling member for locating the mandrel operatively within said recess,
   means defining within the mandrel a flow passage having an inlet positioned to communicate with said supply passage for receiving thermoplastic material therefrom, and an outlet positioned to communicate with said annular chamber,
   said annular chamber defining an uninterrupted annular flow passage extending from said outlet to said orifice.

2. A die assembly according to claim 1, wherein said external surface of the mandrel is configured to induce a spiral component of flow of plastic material along said annular chamber.

3. A die assembly according to claim 1, wherein the nozzle member further provides an internal longitudinally extending air passage for delivering air to the delivery end thereof, and said mandrel includes a vent passage having an inlet positioned to communicate with said air passage and an outlet positioned interiorly of said die orifice for delivering air to the interior of the tubing as it is formed.

4. A die assembly according to claim 8, wherein the external surface of each of said mandrels is configured to induce a spiral component of flow of plastic material along the respective annular chamber.

5. A die assembly according to claim 8, wherein the nozzle member further provides a longitudinally extending internal passage for delivering air to the delivery end thereof, and wherein said mandrels provide respective mutually cooperating vent passages positioned to communicate with said air passage and to deliver air to the interior of the double-walled tubing as it is formed.

6. A die assembly according to claim 1, wherein said first and second coupling members are interengageable screw threaded members.

7. A die assembly according to claim 6, wherein said first and second coupling members are respectively defined by an internally threaded socket in said stem portion and an externally threaded spigot extending from said mandrel.

8. A die assembly according to claim 1, for use in the production of double-walled thermoplastic tubing, said nozzle member providing a second longitudinally extending internal supply passage for the delivery of thermoplastic material to the delivery end thereof, and said mandrel providing a second flow passage positioned to communicate with said second supply passage for receiving thermoplastic material therefrom,
   wherein the mandrel has an axially extending stem terminating in sleeve portion, said mandrel sleeve portion providing a second peripheral lip and defining a second internal recess of circular cross section extending axially therefrom, the mandrel further providing axially extending coupling means on said mandrel stem defining within said second recess a third coupling member,
   the assembly further including a second mandrel located coaxially within said second recess, the second mandrel defining with said second peripheral lip a second annular die orifice, the second mandrel having an external surface spaced from said sleeve portion of the first mandrel and defining a second annular chamber communicating with the second die orifice,
   axially extending coupling means on said second mandrel defining a fourth coupling member engageable with the third coupling member for locating the second mandrel operatively within said second recess, and means defining within the second mandrel a flow passage having an inlet positioned to communicate with said second flow passage of the first mandrel for receiving thermoplastic material therefrom and an outlet positioned to communicate with said second annular chamber, said second annular chamber defining an uninterrupted annular flow passage extending from said outlet to said second die orifice.

9. A die assembly according to claim 8, wherein said coupling members are interengageable screw threaded members.

10. A die assembly according to claim 9, wherein the interengageable coupling members of each pair are respectively defined by an internally threaded socket in the respective said stem portion and an externally threaded spigot extending from the respective said mandrel.

11. A die assembly according to claim 1, for use in the production of double-walled thermoplastic tubing, said nozzle member providing a second longitudinally extending internal supply passage for the delivery of thermoplastic material to the delivery end thereof, and said mandrel providing a second flow passage positioned to communicate with said second supply passage for receiving thermoplastic material therefrom, the assembly further comprising:

- axially extending coupling means on said mandrel defining a third coupling member,
- a second elongate nozzle member coupled to said mandrel coaxially therewith,
- said second nozzle member including a generally cylindrical stem terminating in a sleeve portion, said sleeve portion providing a second peripheral lip and defining a second internal recess of circular cross section extending axially therefrom,
- respective axially extending coupling means at opposite ends of said generally cylindrical stem portion of the second nozzle member defining fourth and fifth coupling members,
- the fourth coupling member being engageable with said third coupling member for coupling the second nozzle member in operative relation to said mandrel,
- a second mandrel located coaxially within said second recess, the mandrel defining with said second peripheral lip a second annular die orifice,
- the second mandrel having an external surface spaced from said sleeve portion of the second nozzle member and defining therewith a second annular chamber communicating with said second die orifice,
- axially extending means on said second mandrel defining a sixth coupling member engageable with said fifth coupling member for locating the mandrel operatively within said second recess,
- means defining within the stem of said second nozzle member a flow passage positioned to communicate with said second flow passage of the first mandrel for receiving thermoplastic material therefrom, and
- means defining within said second mandrel a flow passage having an inlet positioned to communicate with said flow passage of the second nozzle member and an outlet positioned to communicate with said second annular chamber,
- said second annular chamber defining an uninterrupted annular flow passage extending from said outlet to said second die orifice.

12. A die assembly according to claim 11, wherein the external surface of each of said mandrels is configured to induce a spiral component of flow of plastic material along the respective annular chamber.

13. A die assembly according to claim 11, wherein each nozzle member further provides a longitudinally extending internal passage for delivering air to the delivery end thereof, and wherein said mandrels provide respective mutually cooperating vent passages positioned to communicate with said air passage and to deliver air to the interior of the double-walled tubing as it is formed.

14. A die assembly according to claim 11, wherein said coupling members are interengageable screw threaded members.

15. A die assembly according to claim 14, wherein the interengageable coupling members of each pair are respectively defined by an internally threaded socket and an externally threaded spigot coaxially arranged on the respective parts to be coupled.

16. A die assembly according to claim 14, wherein the first nozzle member provides a second longitudinally extending passage for delivering air to the delivery end thereof, said first mandrel providing a second vent passage communicating therewith, and said second mandrel providing a second air passage having an inlet positioned to communicate with said second vent passage and an outlet positioned intermediately between said first and second die orifices for delivering air to the interior of tubing extruded from the first die orifice.

* * * * *